Jan. 23, 1962  J. C. M. FROST ETAL  3,018,068
DISC AIRCRAFT WITH MULTIPLE RADIALLY
DISPOSED GAS TURBINE ENGINES
Filed May 9, 1955  5 Sheets-Sheet 1

INVENTORS
J.C.M. FROST
T.D. EARL
BY
Maybee & Legris
ATTORNEYS.

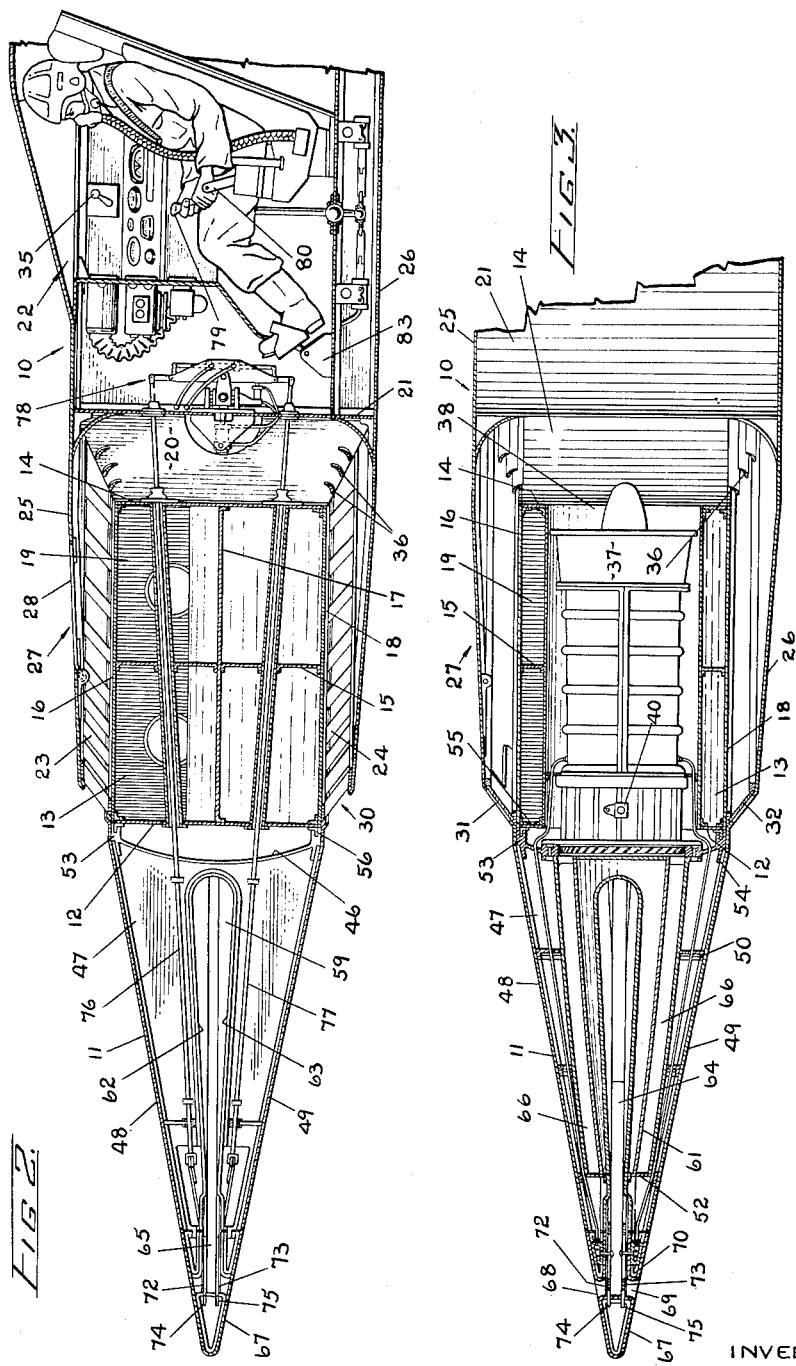

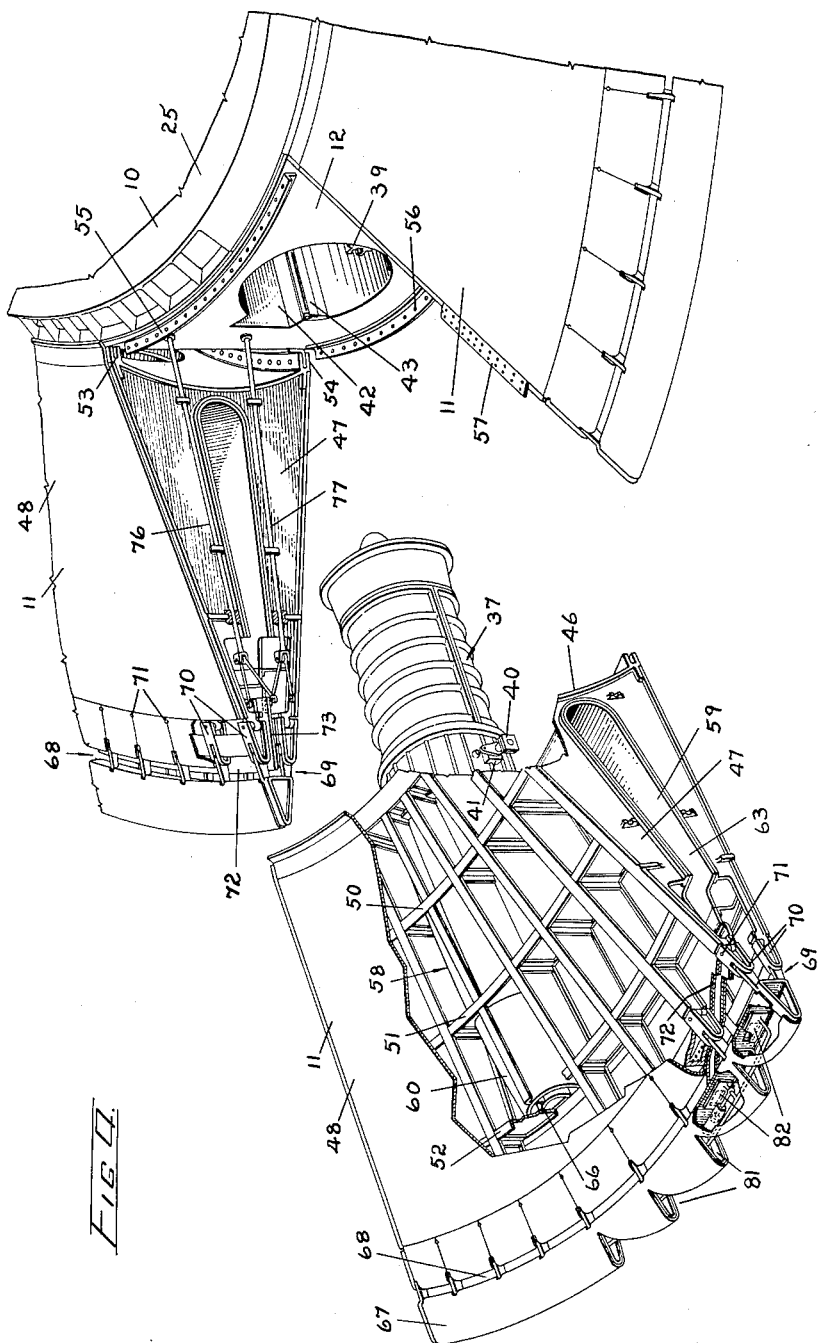

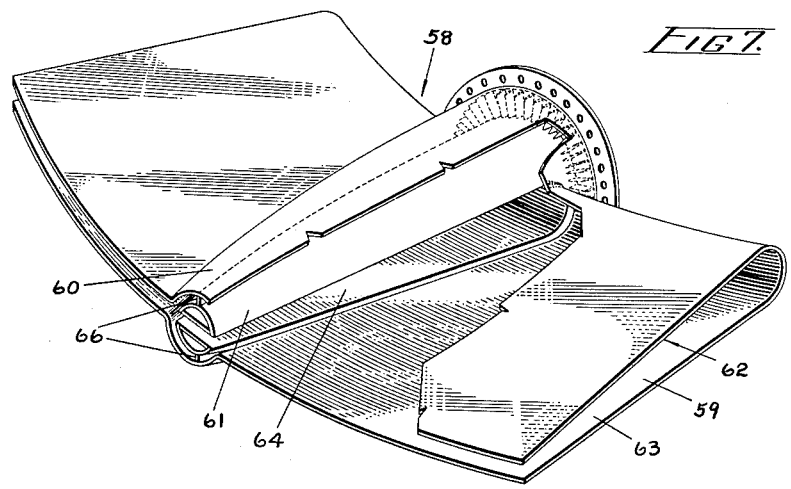
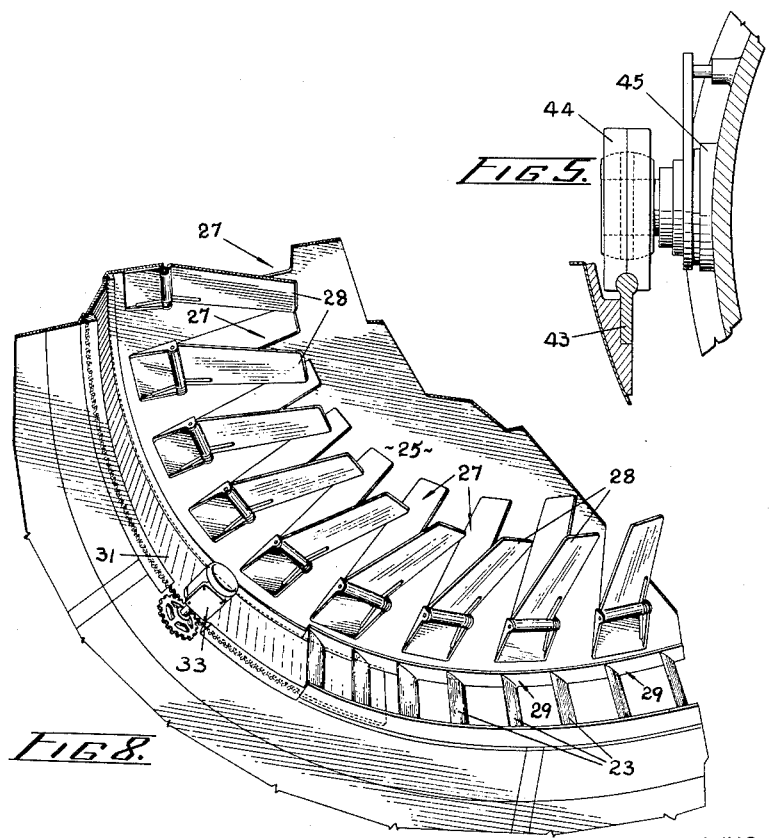

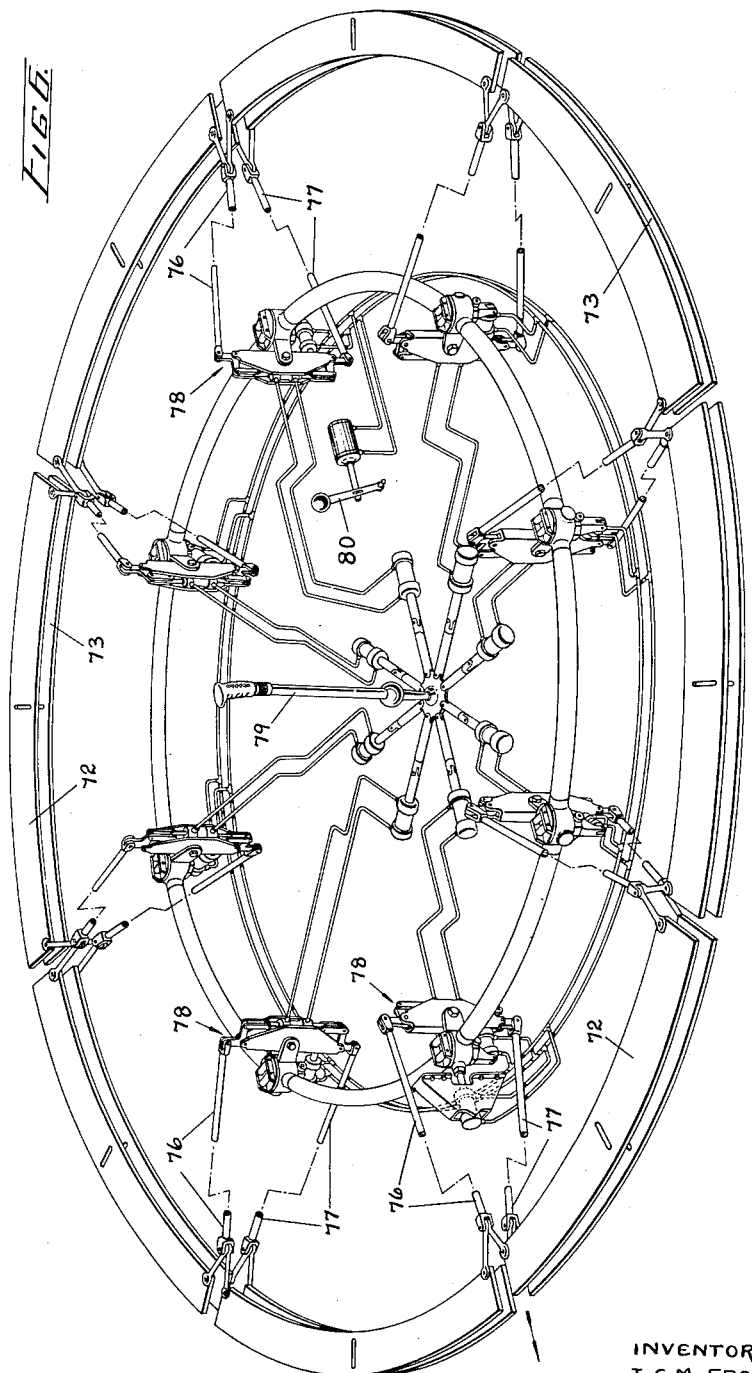

United States Patent Office 3,018,068
Patented Jan. 23, 1962

3,018,068
DISC AIRCRAFT WITH MULTIPLE RADIALLY DISPOSED GAS TURBINE ENGINES
John Carver Meadows Frost and Thomas Desmond Earl, Georgetown, Ontario, Canada, assignors, by mesne assignments, to Avro Aircraft Limited, Malton, Ontario, Canada, a corporation
Filed May 9, 1955, Ser. No. 507,100
Claims priority, application Great Britain May 11, 1954
12 Claims. (Cl. 244—15)

This invention relates to aircraft and more particularly to disc-type or circular aircraft deriving a propulsive thrust from a stream of high-speed gases flowing within the aircraft in generally radial directions and discharged from the periphery thereof. An aircraft of this type is disclosed in the co-pending patent application of John Dubbery, John Carver Meadows Frost and Thomas Desmond Earl, Serial No. 684,615 filed on September 17, 1957.

The aforementioned co-pending application describes an aircraft which comprises a generally lentiform structure sheathed by opposed aerofoil surfaces converging towards each other in an outboard direction from their central inboard portions to their perimetrical edges, and a radial flow gas turbine engine disposed between the said aerofoil surfaces and having a disc-like rotor the plane of rotation of which is approximately parallel to the medial plane between the said opposed surfaces. Air enters an inlet provided in the upper aerofoil surface, then after passing through plenum chambers it flows radially outboardly through a double-sided multi-stage radial flow compressor of a gas turbine engine, then into an annularly arranged combustion chamber of the engine where it supports the combustion of the fuel and from which the products of combustion or gases expand through a radial flow turbine of the engine into a peripheral passage, whence they flow radially outboardly through a perimetrical orifice which includes selectively variable means whereby the flow of ejected gases is directed in a controlled manner to provide a forward thrust.

There is, however, one main undesirable feature in the use of a radial flow gas turbine engine in a disc-type aircraft. In the event of damage to the engine as a result of structural failure or enemy action and to an extent such that the rotor stops, it would be extremely difficult, if not impossible, to land the aircraft safely without power and it would become necessary for the pilot and the crew to abandon the aircraft. This course of action, besides presenting an undesirable hazard to the occupants would greatly increase the attrition rate of the aircraft.

The main object of the invention therefore is to provide a disc-type aircraft having multi-engine reliability.

Another object of the invention is to provide a disc-type aircraft having an improved basic structure resulting in an increased thrust/weight ratio.

The foregoing and other objects and advantages of the invention will become apparent from a study of the following specification, taken in conjunction with the accompanying drawings, in which like reference characters indicate corresponding parts throughout the several views, and in which:

FIG. 2 is a radial sectional view of the aircraft taken along the line 2—2 of FIG. 1;

FIG. 3 is a radial sectional view of the aircraft taken along the line 3—3 of FIG. 1;

FIG. 4 is a perspective view of a portion of the aircraft with a segment detached, and parts of the segment being broken away to show details of construction;

FIG. 5 is a sectional view, to an enlarged scale, of a typical left-hand engine mount;

FIG. 6 is a perspective view of the shutters and shutter controls of the aircraft, the shutter controls being shown to an enlarged scale for the sake of clarity;

FIG. 7 is a perspective view, partly broken away, of an engine exhaust nozzle assembly and exhauster duct; and FIG. 8 is a fragmentary perspective view of the interior of the plenum chamber of the aircraft and showing particularly the air inlet shutters.

Figure 1:
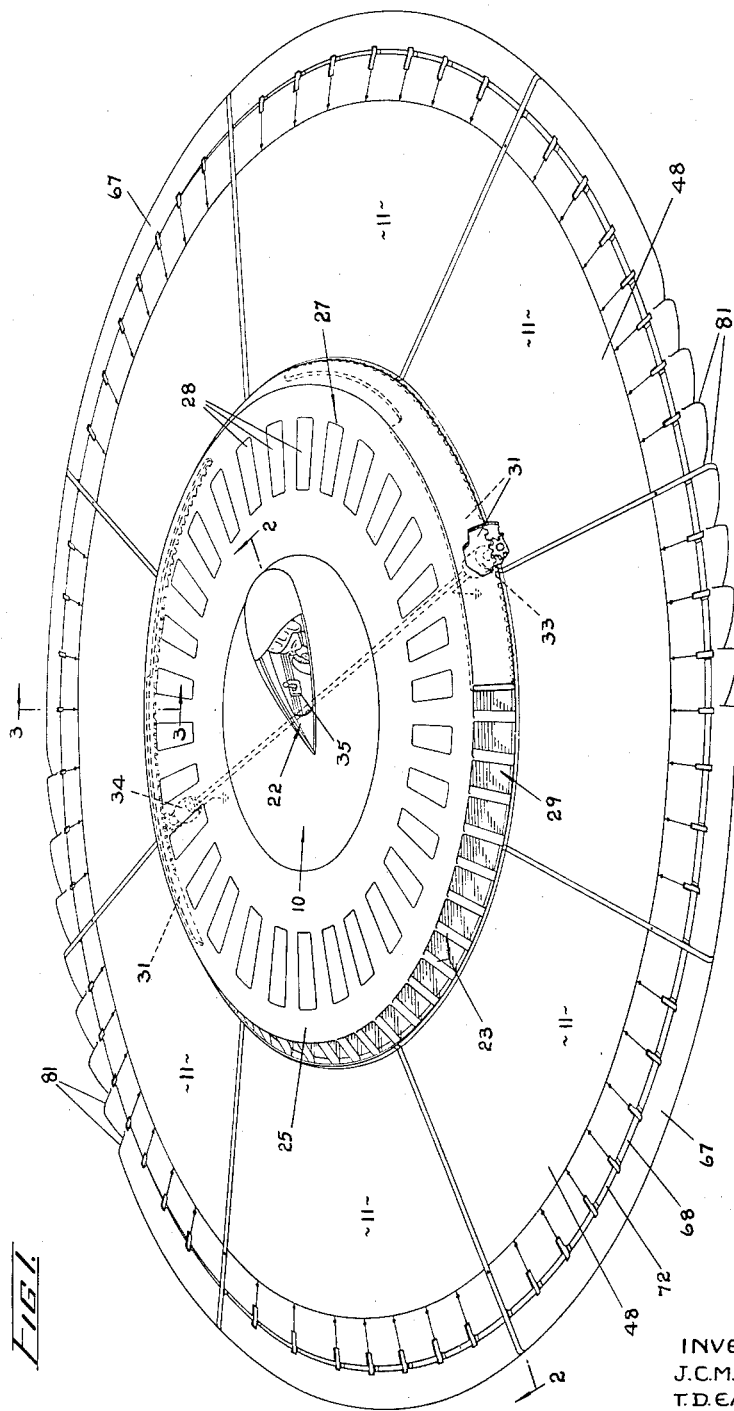
FIG. 1 is a perspective view of an aircraft constructed in accordance with the invention.

The aircraft of the invention is substantially circular in plan form, and in elevation it presents flat double convex surfaces on the central portion of each of which protrude frusto-conical structures; it can be said that the structure is lentiform. The aircraft may be divided into two main sections, namely a core 10 and a series of segments 11 (which preferably are annulus sectors) removably secured to each other and to the core, the segments when secured to each other constituting an annular structure.

The core 10 is defined by an outboard wall, which in the embodiment illustrated is the outboard wall 12 of an annular fuel tank 13. The fuel tank is constituted by the aforesaid wall 12 which is cylindrical, and by an inboard cylindrical wall 14, an intermediate cylindrical wall 15, an upper annular wall 16, an intermediate annular wall 17, a lower annular wall 18, and radial baffles 19; the intermediate annular wall, the intermediate cylindrical wall, and the radial baffles provide compartments whereby shifting of the fuel is reduced. Preferably the fuel tank is pressurized for high altitude flying. The tank configuration and arrangement described lend themselves to ease of fabrication and provide a basic structure of high strength.

Secured to the inboard cylindrical wall 14 of the tank and extending radially inboardly is a series of shear webs 20 which support at their inboard edges a central cylindrical shell 21 defining a pilot's compartment or occupancy chamber 22.

Circumferentially arranged on the upper and lower walls of the fuel tank adjacent its outboard periphery are inboardly sloping ribs 23 and 24 which support respectively an upper central skin 25 and a lower central skin 26 in spaced relationship from the upper tank wall and the lower tank wall respectively. The skins are suitably secured to other structural parts of the aircraft core, including the cylindrical wall 21, and they provide the central outer walls of the aircraft.

The spaces between the upper tank wall 16 and the skin 25, between the lower tank wall 18 and the skin 26, and between the inboard tank wall 14 and the cylindrical wall 21 provide an annular plenum chamber. On the upper skin 25 are circumferentially arranged air inlets 27 which are normally closed by spring loaded doors or shutters 28 (see FIG. 8). The ribs 23 and 24 are sheathed by coverings except at the forward portions where the spaces between the ribs provide additional air inlets 29 and 30. The inlets 29 and 30 are adapted to be closed by sliding doors or shutters 31 and 32 respectively. On the inner edges of these doors are gear teeth which mesh with pinions on the shafts of reversible motors 33 and 34 operable by a suitable control 35 in the pilot's compartment. Extending between adjacent shear webs 20 at their upper and lower extremities are a series of concentric cascades 36 whereby the inboardly flowing air which has entered the inlets is deflected inwardly. The cascades serve not only to give desirable flow characteristics to the air in the plenum chamber but also to stiffen the unsupported edges of the shear webs and improve their stress resistance.

In order to reduce the size of the aircraft it has been found expedient to locate the engines 37 in radially disposed passages provided by generally cylindrical open-ended shells 38 which extend from the outboard tank wall 12 to the inboard tank wall 14; obviously the ends of the shell are hermetically sealed to the tank walls. On one side of each shell is a track 39 adapted to receive a mounting block 40 attached to a mounting pad 41 on the engine. On the opposite side of the shell 38 is a longitudinal recess 42 which is large enough to receive the side mounted accessories of the particular engine installation. Beneath the recess and secured to the shell is a beaded track 43 adapted to slidably receive a notched mounting block 44 attached to a mounting pad 45 on the engine. Thus an engine conveniently may be slid into its passageway and securely held therein, with its intake end in registration with the plenum chamber and its outlet end extending out of the core 10 of the aircraft.

The eight segments or annulus sectors 11 are similar to each other and therefore only one need be described. Each sector comprises an inboard wall 46 which is of curved cross-section for greater strength, and a series of radially extending substantially triangular ribs 47 covered on their outer edges by upper skin segments 48 and lower skin segments 49. Incidentally, the skin segments 48 and 49 of the eight annulus sectors and the central skins 25 and 26 of the core 10 together constitute the aerofoil surfaces of the aircraft. Three series of circumferentially spaced intercostals 50, 51 and 52 extend between adjacent ribs and are secured thereto to provide an exceptionally strong but lightweight structure. The sector may be secured firmly to the core 10 of the aircraft by means of U-shaped members 53 and 54 on the upper and lower edges of the wall 46 and which engage respectively angle brackets 55 and 56 on the core wall 12. The edges of adjacent sectors may be secured to each other by any suitable means, such as by butt straps; a segment of a butt strap is indicated at 57 in FIG. 4.

In each of the sectors is incorporated an exhaust passage constituted by an exhaust nozzle assembly generally indicated at 58 and an exhauster duct 59 (see FIGS. 4 and 7). The exhaust nozzle assembly includes an outboardly tapering outer casing 60 within which is a saddle-shaped or imperfectly ovoid core 61; the inboard ends of the casing and of the core are circular and together they provide the end of an annular exhaust nozzle adapted to register with a turbine outlet, whilst their outboard ends abut one of the intercostals 52 and are closed thereby. The casing 60 fairs into the spaced upper and lower walls 62 and 63 of the exhauster duct 59, and a diametrically extending slot 64 is provided in the core 61 to give continuity to the exhauster duct. The upper skin 48 and the lower skin 49 at their outboard edges meet with the upper and lower walls 62 and 63 of the exhauster duct to provide an exhaust outlet 65. The exhauster ducts of the sectors are in end-to-end registration, and together they constitute an annularly arranged exhaust passage extending circumferentially around the aircraft and terminating in an annular exhaust outlet.

Spacers 66 which extend longitudinally and radially relative to the exhaust nozzle assembly 58 are provided between the opposed surfaces of the casing 60 and of the core 61 to create a strong structural tie between these elements. Of necessity the webs of the ribs 47 and the intercostals 50 and 51 are provided with recesses and are suitably formed to accommodate the exhaust nozzle assembly 58 and especially the exhauster duct 59; it will be observed particularly from FIG. 4 that in the web of each rib 47 is a large slot to accommodate the exhauster duct.

To the inboard wall 46 of each of the sectors is attached the outlet end of one of the gas turbine engines 37, the sector and the engine being separate and readily detachable units. The turbine outlet of the engine is in registration with the exhaust nozzle assembly 58.

A sector 11 with an engine attached conveniently may be moved into position in the space between adjacent sectors, the engine sliding into the passage provided by shell 38 and being guided and supported by the mounting blocks 40 and 44 which bear respectively on the tracks 39 and 43. When the sector and the attached engine are in position, the sector is attached to the core and to the adjacent sectors, as previously mentioned.

Encompassing the perimeter of the aircraft and spaced from the annular exhaust outlet 65 is a ring 67 which is triangular in cross-section, one of its faces being opposed to and spaced from the exhaust nozzle 65 and the other two faces converging towards each other and providing continuations of the skins 48 and 49. The ring and the annular exhaust outlet together provide an upper perimetrical nozzle 68 and a lower perimetrical nozzle 69. The ring is secured to the ribs through diverging arms 70 which are attached to the ends of the ribs by pins 71.

Movable shutters 72 and 73, each consisting of eight sections, are provided for the nozzles 68 and 69 respectively. These shutters are suitably mounted on the upper and lower walls 62 and 63 of the exhauster duct 59, and they are adapted to slide outboardly to close the nozzles and inboardly to open them. The outboard edges of the shutters may be brought into registration with slots 74 and 75 provided in the ring 67.

The construction and operation of the aircraft control system and of its nozzles and shutters are not claimed as part of the present invention. They are described in detail in the co-pending application of John Carver Meadows Frost, Serial No. 507,099, filed on May 9, 1955 and entitled "Vertical Take-Off Aircraft Control."

Referring to FIG. 6, the individual shutter sections are connected at each end by rods 76 or 77 to control mechanisms generally indicated at 78 operable by a universally movable control column 79 and by a two-position selector handle 80. In "take-off position" the selector handle locates the shutters concentrically relative to the two nozzles but moves the upper shutter 72 outboardly to close the upper nozzle 68 and moves the lower shutter 73 inboardly to open the lower nozzle 69. When the selector handle is shifted from take-off position to "flight position" it moves both shutters forwardly to position them eccentrically relative to the nozzles and at the same time moves the upper shuuter 72 inboardly and the lower shutter 73 outboardly so that the openings in corresponding portions of the upper and lower nozzles are equal; thus both nozzles at their extreme forward portions are fully closed, and the nozzle openings are progressively greater to either side of the said extreme forward portions.

With the selector handle 80 set at either take-off or flight position, movement of the control column 79 in any direction relative to the central or neutral position causes a differential movement of the shutters relative to each other in the said direction. For example, if the control column is moved towards port the port portion of the upper shutter and the starboard portion of the lower shutter will move inboardly to increase the openings in the port portion of the upper nozzle and in the starboard portion of the lower nozzle, and the port portion of the lower shutter and the starboard portion of the upper shutter will move outboardly to decrease the nozzle openings in the port portion of the lower nozzle and in the starboard portion of the upper nozzle. It may thus be seen that, both while taking off and in forward flight, the pilot can effect longitudinal and lateral control of the aircraft by appropriate movements of the control column 79.

On the port portion and on the starboard portion of the ring 67 are provided rudder ports 81 which are in communication with the exhaust outlet 65. Suitable shutters 82 to open or close these ports are operated by rudder pedals 83 in the pilot's compartment. Directional control of the aircraft is effected by selective opening and closing of the rudder ports through the operation of the rudder pedals.

On take-off the pilot closes the air inlets 29 and 30 by means of the sliding shutters 31 and 32 to prevent the entrance into the lower inlet of the hot products of combustion ejected from the lower nozzle 69. This causes the spring loaded doors 28 to open automatically by reason of the fact that the pressure differential between the plenum chamber and the atmosphere overcomes the spring forces. In forward flight the pilot opens the sliding shutters so that the air then enters the inlets 29 and 30, and the spring loaded doors 28 close automatically. The air enters the plenum chamber through the open inlet or inlets, is deflected by the cascades 36 and drawn into the intakes of the gas turbine engines 37.

The engines are of the well known axial flow type, and in each engine air is compressed in an axial flow compressor, then passed through a combustion system to which fuel is added, allowed to expand through a turbine which drives the compressor, after which the products of combustion are exhausted through the exhaust nozzle assembly and the exhauster duct and finally to atmosphere through one or both of the perimetrical nozzles 68 and 69.

To take off, the pilot after closing the air inlets 29 and 30 sets the selector handle 80 at take-off position thus closing the upper nozzle 68 and opening the lower nozzle 69. The gases consequently are ejected downwardly from the lower nozzle 69, and because of the "ground cushion" effect the aircraft, which may have a weight greater than the combined static thrust of all the engines, rises vertically above the ground.

In order to transfer to forward flight, the pilot slowly moves the selector handle 80 to flight position, thus closing the forward portions of both the upper and lower nozzles 68 and 69 and opening the remaining portions. This movement of the selector handle into flight position is done slowly so that the vertical lift from the downwardly directed gases is only gradually destroyed as the aircraft picks up flying speed and acquires lift resulting from the aerodynamic forces on the aerofoil surfaces. As soon as the aircraft has risen some distance from the ground and is in forward flight the air inlets 29 and 30 may be opened, causing the spring loaded doors 28 to close automatically; this allows the aircraft to take advantage of ram in the intake.

Due to the fact that the large rotor of the radial flow engine of the aforementioned application Serial No. 502,156 has been replaced by a plurality of axial flow engines, an aircraft constructed in accordance with the present invention is not gyroscopically stable. The aircraft, however, can be stabilized in any one of several ways. For example, it is possible to depend entirely on automatic stabilization by means of rate gyros and hydraulic transmission, or stability may be effected by adding weight at the front to move the centre of gravity forward.

It is to be understood that the form of the invention herewith shown and described is to be taken as a preferred example of the same, and that various changes in the shape, size and arrangement of the parts may be resorted to without departing from the spirit of the invention or the scope of the subjoined claims.

What we claim as our invention is:

1. An aircraft comprising a generally lentiform structure sheathed by opposed aerofoil surfaces which provide lift developing surfaces, a group of gas turbine engines positioned between the aerofoil surfaces in a generally radial arrangement with their intakes directed towards the centre of the structure and their outlets directed towards its perimeter, and means encompassing the engine outlets and directing the products of combustion ejected therefrom to provide a propulsive thrust.

2. An aircraft comprising a generally lentiform structure sheathed by opposed aerofoil surfaces which provide lift developing surfaces, a group of gas turbine engines positioned between the aerofoil surfaces in a generally radial and approximately equiangular arrangement with their intakes directed towards the centre of the structure and their outlets directed towards its perimeter, and means encompassing the engine outlets and directing the products of combustion ejected therefrom to provide a propulsive thrust.

3. An aircraft comprising a generally lentiform structure sheathed by opposed aerofoil surfaces which provide lift developing surfaces, a plenum chamber annularly arranged in the structure around its central portion, an air inlet for the plenum chamber in at least one of the aerofoil surfaces, a group of gas turbine engines positioned between the aerofoil surfaces in a generally radial arrangement with their intakes in registration with the plenum chamber and their outlets directed towards the perimeter of the structure, and means encompassing the engine outlets and directing the products of combustion ejected therefrom to provide a propulsive thrust.

4. A disc-type aircraft comprising a core defined by a wall and embodying an occupancy chamber at its centre and an annularly disposed plenum chamber, a group of gas turbine engines in a radial arrangement with their intake ends extending within the core and in registration with the plenum chamber and with their outlet ends facing outboardly, an outboardly tapering annular framework secured to the core around its wall and encompassing the outlet ends of the engines, an annularly arranged exhaust passage in the framework registering with the outlet ends of the engines, opposed aerofoil surfaces sheathing the core, the framework and the engines to provide lift developing surfaces of the aircraft, an opening in at least one of the aerofoil surfaces to provide an air inlet for the plenum chamber, and means adjacent the periphery of the aircraft and co-operating with the exhaust passage to direct the products of combustion ejected from the engines to provide a propulsive thrust.

5. A disc-type aircraft comprising a core defined by a wall and embodying an occupancy chamber at its centre and an annularly disposed plenum chamber, a group of gas turbine engines mounted in the core in a radial arrangement, the intake ends of the engines extending into the plenum chamber and the outlet ends facing outboardly, an annularly arranged fuel tank in the core and occupying mainly the spaces between the engines, an outboardly tapering annular framework secured to the core around its wall and encompassing the outlet ends of the engines, an annularly arranged exhaust passage in the framework registering with the outlet ends of the engines, opposed aerofoil surfaces sheathing the core, the framework and the engines to provide lift developing surfaces of the aircraft, an opening in at least one of the aerofoil surfaces to provide an air inlet for the plenum chamber, and means adjacent the periphery of the aircraft and co-operating with the exhaust passage to direct the products of combustion ejected from the engines to provide a propulsive thrust.

6. A disc-type aircraft comprising a core defined by a wall and embodying an annularly arranged fuel tank, an occupancy chamber at the centre of the core and an annular plenum chamber interposed between the occupancy chamber and the fuel tank, a plurality of radially arranged passages in the fuel tank and opening through the wall, a gas turbine engine in each passage, the intakes of the engines being in communication with the plenum chamber and their outlet ends facing outboardly, an outboardly tapering annular framework secured to the core around its wall and encompassing the outlet ends of the engines, an annularly arranged exhaust passage in the framework registering with the outlet ends of the engines, opposed aerofoil surfaces sheathing the core, the framework and the engines to provide lift developing surfaces of the aircraft, an opening in at least one of the aerofoil surfaces to provide air inlets for the plenum chamber, and means adjacent the periphery of the aircraft and co-operating with the exhaust passage to direct the products of combustion ejected from the engines to provide a propulsive thrust.

7. A disc-type aircraft comprising a core defined by a wall and embodying an occupancy chamber at its centre and a plenum chamber, a plurality of radially arranged passages in the core and opening through the wall, a series of segments removably secured to each other and to the core, the segments secured to each other constituting an annular structure and the annular structure secured to the core constituting a disc-like structure, gas turbine engines mounted respectively on each segment and having their outlet ends extending towards the outboard edge of the segment, and their intake ends projecting from the inboard edge of the segment, the intake end of each gas turbine engine passing through an opening in the wall and extending into one of the passages provided in the core when the segment on which the engine is mounted in secured to the core, the intake of an engine thus positioned being in communication with the plenum chamber, opposed generally circular aerofoil surfaces sheathing the core and the segments to provide lift developing surfaces of the aircraft, an opening in at least one of the aerofoil surfaces providing an air inlet for the plenum chamber, and means adjacent the periphery of the aircraft to direct the products of combustion ejected from the engine outlets to provide a propulsive thrust.

8. A disc-type aircraft comprising a core defined by a wall and embodying an occupancy chamber at its centre and a plenum chamber, a plurality of radially arranged passages within the core and opening through the wall, gas turbine engines in the passages, the intakes of the engines being in communication with the plenum chamber and their outlet ends facing outboardly, co-operating means of the engines and of the core enabling the engines to be removably slid into the passages, segmental members each secured to the outlet end of an engine and to the core wall, adjacent segmental members being also secured to each other to provide an annular structure within which is the core, opposed generally circular aerofoil surfaces sheathing the core and the segmental members to provide lift developing surfaces of the aircraft, an opening in at least one of the aerofoil surfaces to provide an air inlet for the plenum chamber, an exhaust passage in each segmental member and having one end in registration with the outlet of the engine to which the member is secured, the exhaust passages of the series of segmental members together constituting an annularly arranged exhaust passage through which the products of combustion flow radially outboardly from the engine outlets, and means adjacent the periphery of the aircraft and encompassing the annularly arranged exhaust passage to direct the products of combustion ejected therefrom to provide a propulsive thrust.

9. A disc-type aircraft comprising a core embodying an occupancy chamber at its centre and a plenum chamber, a plurality of radially arranged passages in the core, a series of segmental members removably attached at their inboard sides to the periphery of the core, adjacent segmental members also being removably secured to each other, the series of segmental members together constituting an annular structure disposed around the core, gas turbine engines secured to the segmental members and having their intake ends projecting from the inboard sides of the segmental members, the engines slidably entering the core passages when the segmental members are assembled to the core and being nested in the passages with their intakes in communication with the plenum chamber, a nozzle assembly in each segmental member in registration with an engine outlet and including a casing and a core spaced therefrom, an exhauster duct in each segmental member provided by opposed generally parallel walls which blend with the casing of the nozzle assembly, the exhauster ducts of the series of segmental members being in registration and together providing an annularly arranged exhaust passage through which the products of combustion may flow radially outboardly from the engine outlets, and means encompassing the annularly arranged exhaust passage to direct the products of combustion to provide a propulsive thrust.

10. A disc-type aircraft comprising a generally lentiform structure sheathed by opposed aerofoil surfaces which provide lift developing surfaces, a plenum chamber in the structure, a group of gas turbines positioned between the aerofoil surfaces in a generally radial arrangement with their intakes in registration with the plenum chamber and their outlets directed toward the perimeter of the structure, a port for an air inlet on one of the aerofoil surfaces and disposed at an angle to that surface so that air may be forced therein during forward flight of the aircraft, a shutter for the said port, manually operable means for opening and closing the shutter, a second port for an air inlet substantially in the plane of the upper aerofoil surface, a closure for the second port, biasing means urging the closure to closed condition, the biasing means holding the closure in closed condition when the shutter is open and the pressure differential between the atmosphere and the air in the plenum chamber overcoming the biasing means and opening the closure when the shutter is closed and the gas turbine engines are in operation, and means encompassing the engine outlets and directing the products of combustion ejected therefrom to provide a propulsive thrust.

11. A disc-type aircraft comprising a generally lentiform structure sheathed by opposed upper and lower aerofoil surfaces which provide lift developing surfaces, gas turbine engine means positioned between the aerofoil surfaces and having a peripheral outlet adjacent the perimeter of the structure, a port for an air inlet for the gas turbine engine means on one of the aerofoil surfaces and disposed at an angle to that surface so that the air may be forced therein during forward flight of the aircraft, a shutter for the said port, manually operable means for opening and closing the shutter, a second port for an air inlet for the gas turbine means substantially in the plane of the upper aerofoil surface, a closure for the said second port, and biasing means urging the closure to closed condition, the biasing means holding the closure in closed condition when the shutter is open and the pressure differential between the atmosphere and the air within the aircraft overcoming the biasing means and opening the closure when the shutter is closed and the gas turbine engine means is in operation.

12. An aircraft as claimed in claim 11, in which housings are provided on each of the aerofoil surfaces, the said housings having edge surfaces angularly disposed to the aerofoil surfaces and which create discontinuities in the aerofoil surfaces, the first mentioned port being located in one of the said edge surfaces.

References Cited in the file of this patent

FOREIGN PATENTS 1,047,657   France _____ July 29, 1953